G. E. LYNCH.
TROLLEY MECHANISM.
APPLICATION FILED JUNE 24, 1907.
1,138,965.
Patented May 11, 1915.
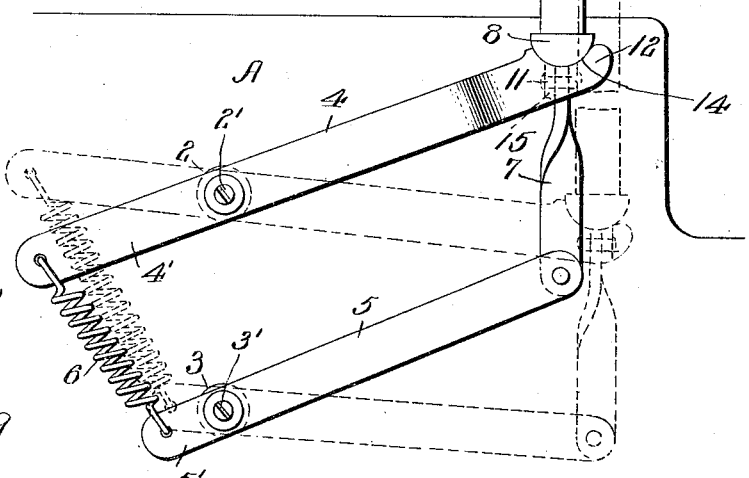
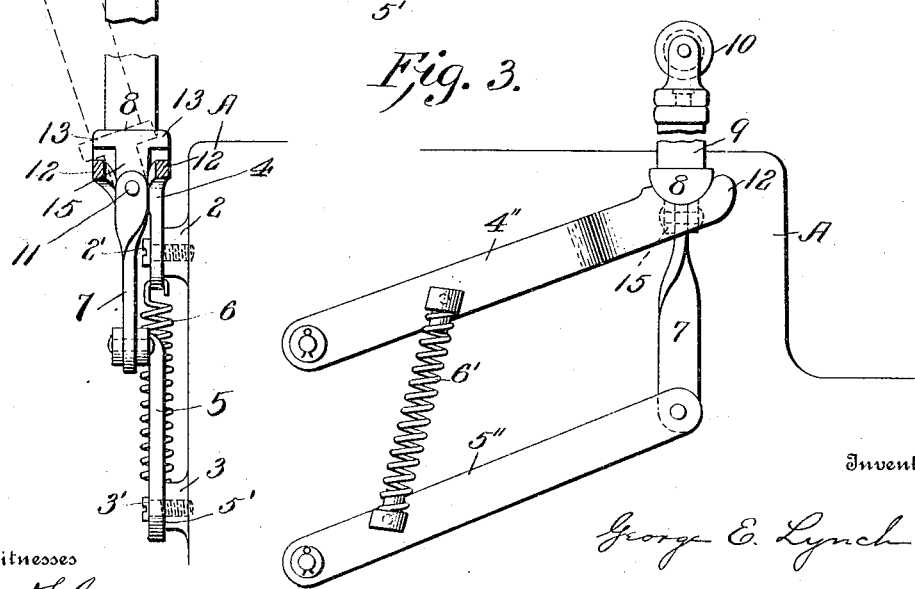

UNITED STATES PATENT OFFICE.

GEORGE E. LYNCH, OF CHELSEA, MASSACHUSETTS, ASSIGNOR, BY MESNE ASSIGNMENTS, TO THE JEFFREY MANUFACTURING COMPANY, A CORPORATION OF OHIO.

TROLLEY MECHANISM.

1,138,965.  Specification of Letters Patent.  Patented May 11, 1915.

Application filed June 24, 1907. Serial No. 380,638.

*To all whom it may concern:*

Be it known that I, GEORGE E. LYNCH, a citizen of the United States, residing at Chelsea, in the county of Suffolk and State of Massachusetts, have invented certain new and useful Improvements in Trolley Mechanism, of which the following is a specification, reference being had therein to the accompanying drawing.

This invention relates to a trolley or traveling contact device for taking electric current from a supply-wire, one of its objects being to provide a trolley that need not be reversed when the direction of travel of the locomotive is changed.

A further object of the invention is to provide in a trolley apparatus a trolley arm support which is vertically movable under the influence of a spring and a trolley arm pivoted to the support for movement transversely of the car. Stated more specifically, the object is to provide a trolley apparatus in which the vertically movable support is pivoted to swing in a vertical plane; and stated still more specifically, the object is to provide a support comprising two parallel links or bars which cause the pivotal connection for the arm to move vertically in parallelism. Other objects will be apparent from the following specification and claims.

In the accompanying drawings—Figure 1 is a side view of a trolley apparatus embodying my invention, it being represented as applied to a car of the mine locomotive type. Fig. 2 is an end view of the trolley apparatus. Fig. 3 is a side view of an apparatus embodying another form of my invention.

In the accompanying drawings, A represents a locomotive or car which may be of any usual or approved construction, that selected for the purpose of illustration being of a well known mine locomotive type. In the construction shown in the drawing the main frame of the locomotive or car serves as a base frame for the trolley apparatus, but as to this there can be variation. As shown projections 2, 3, extend from the frame and into these are fitted pivot pins or screws 2', 3'. Upon these pins are mounted bars or levers 4, 5, which are connected together near one end (which end I shall term the front end for convenience in description) by a link 7 arranged to maintain them in parallel relation to each other into whatever positions they may be turned about their respective pivots. The rear ends 4', 5', of the levers 4, 5, are of unequal length, preferably that of the upper lever, 4', being the longer. These rear ends of the bars or levers are connected by a strong tension spring 6. It will be understood that if the front ends of the levers 4, 5, are depressed, the springs 6 will be distended, owing to the unequal length of the rear arms of the levers, so that the tendency of the spring is to force upward the forward ends of the levers. The bars 5, 5, and the link 7 serve as a support for the trolley arm which will now be described.

10 represents the trolley wheel arranged to run upon the supply wire B, the position of which relative to the car A may vary considerably vertically, as indicated in Fig. 1. The trolley is carried at the upper end of an arm 9 that is mounted at its lower end in a socket 8. The socket 8 is provided with laterally extending projections, 13, 13, that are adapted to rest in seats 14, provided therefor in the front end of the upper lever 4, such end being forked, as indicated in Fig. 2, to form bearings for the trolley socket 8, which are comparatively widely separated transversely. The socket for the trolley arm 9 is provided with a downward extending lug or projection 15, that is connected by a pivot pin 11 with the upper end of the link 7. The axis of the pivot pin 11 is so disposed as to permit a lateral or transverse vibration of the trolley arm, in order to allow the trolley to follow the wire in its lateral undulations. The connection between the link 7 and the trolley socket 8 extends up between the two arms 12 of the forked portion of the upper lever 4.

It has already been explained how the spring 6 tends throw upward the forward end of the trolley support, from which it is apparent that the spring operates to hold the trolley against the wire B, whether it be high above or close to the top of the locomotive. It has also been stated that the trolley arm is free to vibrate laterally upon the pivot pin 11 in order to follow the lateral undulations of the wire. It will be noted that the axis of the pivot pin 11 lies in or near the vertical plane of movement of the bars 4 and 5. In addition to moving the trolley support upward the spring 6 tends to restore the trolley-arm to and maintain it in a centrally vertical position. If the trolley-arm be deflected to one side, as indicated in dotted lines in Fig. 2, as the trolley 10 follows the wire B, the lateral projection or arm 13, to the right of the trolley base or socket will bear down upon the arm 12 on which it rests, and depress to a certain extent the forward end of the arm 4, this resulting in a distention of the spring. The force of the spring tends always to restore the trolley base to its normal position, with its two projections 13 resting in the seats formed therefor in the arm 12.

In Fig. 3 I have illustrated a form of my invention differing somewhat from that shown in the other views. In Figs. 1 and 2 the levers 4 and 5 are of the first class, while in the form of apparatus illustrated in Fig. 3 levers, designated 4″ and 5″, are of the third class. The spring 6′ is an expansion spring. Its ends are connected respectively with the levers, but at different distances from the pivots thereof, so that the length of the arms between the pivots and the points of connection of the spring with the respective levers are unequal. The operation of this last referred to trolley apparatus will be apparent without further description.

By mounting the trolley frame at the side of the car I am enabled to bring the apparatus low down, which is exceedingly desirable under many conditions, as for instance in mines where the head room is often very limited. It will be observed also that the construction of the supporting frame is such as to project but little laterally or beyond the side of the car frame. I have thus constructed a trolley apparatus that is simple in construction, and can be conveniently applied to a car in such manner that the supporting frame projects but little beyond the lines of the body of the car.

What I claim is:—

1. The combination with a car, of supports thereon, a frame mounted on the supports and provided with a vertically movable part, a trolley arm connected with the vertically movable part of the frame and movable therewith, the connection between the arm and the frame being such that the arm may swing transversely about an axis extending longitudinally of the car, a spring and connections whereby said spring serves to elevate the movable part of the frame together with the trolley arm and through which the force of the spring is transmitted to tend to hold the arm in normal central position, substantially as set forth.

2. In a trolley, the combination of a pair of levers mounted upon separate pivotal supports and having rear arms of unequal length, means for maintaining the levers in parallel relation with each other, a spring between the ends of the rear arms of the levers for elevating the forward arms of the levers, and a trolley arm supported on the front arms of the levers, substantially as set forth.

3. In a trolley apparatus, the combination of a normally vertical trolley arm, a mechanism on which the arm is supported and for normally holding the arm in normal vertical position, the construction being such that the arm can swing transversely about a horizontal axis, the said mechanism comprising a pair of levers, two supports on which the levers are pivotally mounted, means for maintaining the levers in parallel relation to each other in different positions to which they may be moved, and a spring for holding the levers in position to operatively support the trolley arm, substantially as set forth.

4. In an under-running trolley apparatus, the combination of a supporting frame, comprising a pair of levers pivotally supported between their ends upon separate pivots, the rear ends of the levers being of unequal length, and a link connecting the forward ends of the levers and serving to maintain them in parallel relation with each other, a vertically movable trolley arm supported by the said frame near its forward end, a pivotal connection between the said frame and the trolley arm to permit the latter to swing laterally, and a spring connected to the rear ends of the levers for holding the trolley up against the supply wire, substantially as set forth.

5. In a trolley apparatus, the combination of a pair of levers, two supports on which the levers are pivotally mounted, a trolley arm resting on the upper of said levers, a link connecting the lower lever with the trolley arm, and a spring connected to the upper lever to force it upward and to the lower lever to resist upward movement thereof, the lever arms being so proportioned that the spring will hold the upper lever and the trolley arm in contact and lift the forward ends of both of the levers to move the trolley arm into operative position, substantially as set forth.

6. In a trolley apparatus, the combination of a pair of levers, a pair of supports arranged one above the other on which the levers are pivotally mounted, the forward end of the upper lever being forked and provided with seats, a trolley arm having a base or socket portion adapted to rest in the seats of the forked end of the upper lever, a link connecting the forward end of the lower lever with the base of the trolley arm, the connection between the link and the base being a pivotal one adapted to permit the trolley arm to swing laterally in a substantially vertical plane, and a spring connected to the upper lever to force the forward end thereof upward and to the lower lever to resist upward movement of the forward end thereof, the spring thus serving to separate the forward ends of the levers to hold the trolley arm base in contact with the seats of the fork end of the upper lever and the lever arms being so proportioned that the spring will lift the forward ends of both of the levers to throw the trolley arm into operative position, substantially as set forth.

7. In a trolley apparatus, the combination of a vertical trolley arm, a supporting mechanism to which the arm is pivoted to swing transversely, the said supporting mechanism comprising means for holding the arm normally in vertical position and adapted to permit it to move transversely to oblique positions and for moving the arm longitudinally upward into operative position, substantially as set forth.

8. The combination with a car, of two links mounted substantially in the same plane, a spring tending to hold adjacent ends of the links apart, and a two-part trolley arm with a pivotal connection between the parts permitting one part to swing in a plane transversely of the car with respect to the other part, the lower end of the lower part being pivoted to one of said link ends, and the lower end of the upper part being supported by the other of said link ends, substantially as set forth.

9. In an under-running trolley apparatus, the combination of a base frame, a trolley arm support comprising an upright link and means for connecting the said link to the base frame and guiding it for vertical movement with respect thereto in parallelism with itself, a trolley arm having its upper end movable laterally with respect to the support, a horizontal pivotal connection between the lower end of the arm and the support, a trolley wheel rotatably mounted on the arm at the upper end thereof, and spring means tending to move the said link upward away from the base frame and to move the said arm about the axis of the said pivotal connection toward a vertical position.

10. In an under-running trolley apparatus, the combination of a base frame, a trolley arm support pivotally connected to the frame for movement in a vertical plane, a trolley arm pivotally mounted on the support and adapted to lie in the plane of movement of the support or to be moved to a position at an upward and outward angle to the said plane, spring mechanism operative when the arm is at an angle to the said vertical plane tending to move the arm upward with respect to its point of pivotal connection with the support, and a trolley wheel on the arm.

11. In an under-running trolley apparatus, the combination of a base frame, a trolley arm support pivotally connected to the frame for movement in a vertical plane, a trolley arm pivotally mounted on the support and adapted to lie in the plane of movement of the support or to be moved to a position at an upward and outward angle to the said plane, spring mechanism operative when the arm is at an angle to the said vertical plane tending to move the support and the arm upward with respect to their respective points of pivotal connection, and a trolley wheel on the arm.

12. In an under-running trolley apparatus, the combination of a base frame, two parallel bars each pivoted to the frame for movement in a vertical plane, a vertical link pivotally connected to the outer ends of the bars, a trolley arm pivotally connected to the said link and adapted to lie in the plane of movement of the bars or to be moved to a position at an upward and outward angle to the said plane, spring mechanism operative when the arm is at an angle to the said vertical plane tending to move the bars and the arm upward with respect to their respective points of pivotal connection, and a trolley wheel on the arm.

In testimony whereof I affix my signature, in presence of two witnesses.

GEORGE E. LYNCH.

Witnesses:
H. C. FREEMAN,
R. A. McMULLIN.

Copies of this patent may be obtained for five cents each, by addressing the "Commissioner of Patents, Washington, D. C."